(12) United States Patent
Liu et al.

(10) Patent No.: US 12,488,515 B2
(45) Date of Patent: Dec. 2, 2025

(54) DISPLAY METHOD AND APPARATUS FOR VIRTUAL DESKTOP

(71) Applicant: SHANGHAI BILIBILI TECHNOLOGY CO., LTD., Shanghai (CN)

(72) Inventors: Peng Liu, Shanghai (CN); Yongyong Sun, Shanghai (CN); Jiaqi Tao, Shanghai (CN); Mingming Zhang, Shanghai (CN); Manman Zheng, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 139 days.

(21) Appl. No.: 18/521,332

(22) Filed: Nov. 28, 2023

(65) Prior Publication Data

US 2024/0177371 A1    May 30, 2024

(30) Foreign Application Priority Data

Nov. 30, 2022 (CN) .......................... 202211533793.4

(51) Int. Cl.
G06T 11/00 (2006.01)
(52) U.S. Cl.
CPC ................................. G06T 11/001 (2013.01)
(58) Field of Classification Search
CPC ............... G06T 11/001; G06T 2200/24; G06F 2206/1008
See application file for complete search history.

(56) References Cited

U.S. PATENT DOCUMENTS

2019/0206109 A1    7/2019    Chu

FOREIGN PATENT DOCUMENTS

| CN | 110377392 A | 10/2019 |
| CN | 111464699 A | 7/2020 |

(Continued)

OTHER PUBLICATIONS

"How to Use OpenGL ES 2 in an Android Live Wallpaper | Learn OpenGL ES. Learn OpenGL ES | Learn How to Develop Mobile Graphics Using OpenGL ES 2." Admin. (Jul. 28, 2021). Retrieved Jun. 12, 2025 from https://www.learnopengles.com/how-to-use-opengl-es-2-in-an-android-live-wallpaper/ (Year: 2021).*

(Continued)

*Primary Examiner* — Antonio A Caschera
(74) *Attorney, Agent, or Firm* — BakerHostetler

(57) ABSTRACT

Techniques for generating and displaying desktop wallpapers are disclosed. The techniques comprise creating a view proxy container instance in response to an operation performed on a control element, wherein the control element is configured to trigger generation and display of desktop wallpapers based on video or game frame images; binding the view proxy container instance to a desktop wallpaper rendering thread of a desktop wallpaper service engine; loading image data into the desktop wallpaper rendering thread by the view proxy container instance, wherein the image data is acquired from a video or a game; generating a desktop wallpaper based on rendering the image data by the desktop wallpaper rendering thread; and displaying the desktop wallpaper on a desktop of a computing device.

18 Claims, 12 Drawing Sheets

(56) References Cited

FOREIGN PATENT DOCUMENTS

| CN | 115049776 A | 9/2022 |
|---|---|---|
| CN | 115278338 A | 11/2022 |

OTHER PUBLICATIONS

GLSurfaceView. (Apr. 17, 2025). developer.android.com. Retrieved Jun. 12, 2025, from https://developer.android.com/reference/android/opengl/GLSurfaceView. (Year: 2025).*

China Patent Application No. 202211533793.4; First Office Action; dated Jul. 24, 2025; 33 pages.

Android uses WallpaperService and openGL ES to generate dynamic graphics to set dynamic wallpaper; https://blog.csdn.net/weixin_43749999/article/details/117825835; CSDN; Jun. 2021; accessed Jul. 25, 2025; 21 pages.

* cited by examiner

DISPLAY METHOD AND APPARATUS FOR VIRTUAL DESKTOP

CROSS-REFERENCE TO RELATED APPLICATION

The present application claims priority to Chinese Patent Application No. 202211533793.4, filed on Nov. 30, 2022, which is incorporated herein by reference in its entirety.

BACKGROUND ART

With the development of computer technologies, electronic products with screens such as mobile phones, computers, and tablets have become daily necessities. Users can select desktop wallpapers on screens, such as a static image.

SUMMARY OF THE INVENTION

An objective of embodiments of the present application is to provide a display method and apparatus for a virtual desktop, a computer device, and a computer-readable storage medium, to solve the above problems.

A first aspect of the embodiments of the present application provides a display method for a virtual desktop, including: creating a view proxy container instance; binding the view proxy container instance to a desktop wallpaper rendering thread of a desktop wallpaper service engine; loading image data into the desktop wallpaper rendering thread by the view proxy container instance; and rendering the image data by the desktop wallpaper rendering thread, so as to display a virtual picture on a desktop.

Optionally, the method further includes: monitoring an interaction event by the desktop wallpaper service engine; providing event information about the interaction event to the view proxy container instance by the desktop wallpaper service engine; providing the event information about the interaction event to a target engine by the view proxy container instance, so as to cause the target engine to execute a corresponding preset logic and update the image data based on a drawing layer of the target engine; providing updated image data to the desktop wallpaper rendering thread by the view proxy container instance; and rendering the updated image data by the desktop wallpaper rendering thread, so as to update a wallpaper for the desktop.

Optionally, the method further includes: using a picture from other games or live streaming as the wallpaper for the desktop by switching the drawing layer of the target engine.

Optionally, the method further includes: providing a preliminary background image during loading of a resource package; generating a target background image based on a current wallpaper operating state of the desktop and the preliminary background image; generating a background texture based on the target background image by the view proxy container instance; providing the background texture to the desktop wallpaper rendering thread by the view proxy container instance; and rendering the background texture by the desktop wallpaper rendering thread, so as to display a rendering result as a wallpaper on the desktop.

Optionally, the method further includes: switching to providing data by a drawing layer of a target engine when it is determined that drawing of a first frame of a target object is completed.

Optionally, the method further includes: rendering image data drawn by the target engine into a target texture, the target texture being attached to an FBO; rendering video image data in a target video onto a shared texture, the shared texture being a texture used by a plurality of threads; performing a texture blending operation on the target texture and the shared texture, so as to obtain a target blended texture; and displaying content in the target blended texture on the desktop.

Optionally, the performing a texture blending operation on the target texture and the shared texture, so as to obtain a target blended texture includes: covering the shared texture with the target texture, so as to obtain the target blended texture.

A second aspect of the embodiments of the present application provides a display apparatus for a virtual desktop, including: a creating module configured to create a view proxy container instance; a binding module configured to bind the view proxy container instance to a desktop wallpaper rendering thread of a desktop wallpaper service engine; a loading module configured to load a picture to be drawn into the desktop wallpaper rendering thread by the view proxy container instance; and a rendering module configured to render image data by the desktop wallpaper rendering thread, so as to display a virtual picture on a desktop.

A third aspect of the embodiments of the present application provides a display method for a virtual desktop, including: obtaining image data of a target application, the image data including video image data or game image data; and displaying, on a desktop in response to a preset operation, a virtual picture corresponding to the image data.

Optionally, the displaying, on a desktop, a virtual picture corresponding to the image data includes the steps of the display method for a virtual desktop according to the third aspect.

A fourth aspect of the embodiments of the present application provides a computer device including a memory, a processor, and a computer program stored on the memory and executable on the processor, where the processor, when executing the computer program, is configured to implement the steps of the above display method for a virtual desktop.

A fifth aspect of the embodiments of the present application provides a computer-readable storage medium having a computer program stored therein, where the computer program is capable of being executed by at least one processor, so as to cause the at least one processor to perform the steps of the above display method for a virtual desktop.

According to the display method and apparatus for a virtual desktop, the computer device, and the computer-readable storage medium provided by the embodiments of the present application, the desktop wallpaper rendering thread is taken over, and the view proxy container instance is bound to the desktop wallpaper rendering thread, such that the rendering operation of the target engine (such as a game engine) can be implemented in the desktop wallpaper rendering thread. Equivalently, the drawing layer of the target engine is wrapped in the desktop wallpaper rendering thread, the image data of the drawing layer of the target engine can be rendered in the desktop wallpaper rendering thread, and the rendering result of the image data is displayed on the desktop as the wallpaper. Therefore, in the embodiments of the present application, the desktop supports real-time pictures from games and live streaming as wallpapers, providing good playability.

DETAILED DESCRIPTION OF EMBODIMENTS

Figure 1:
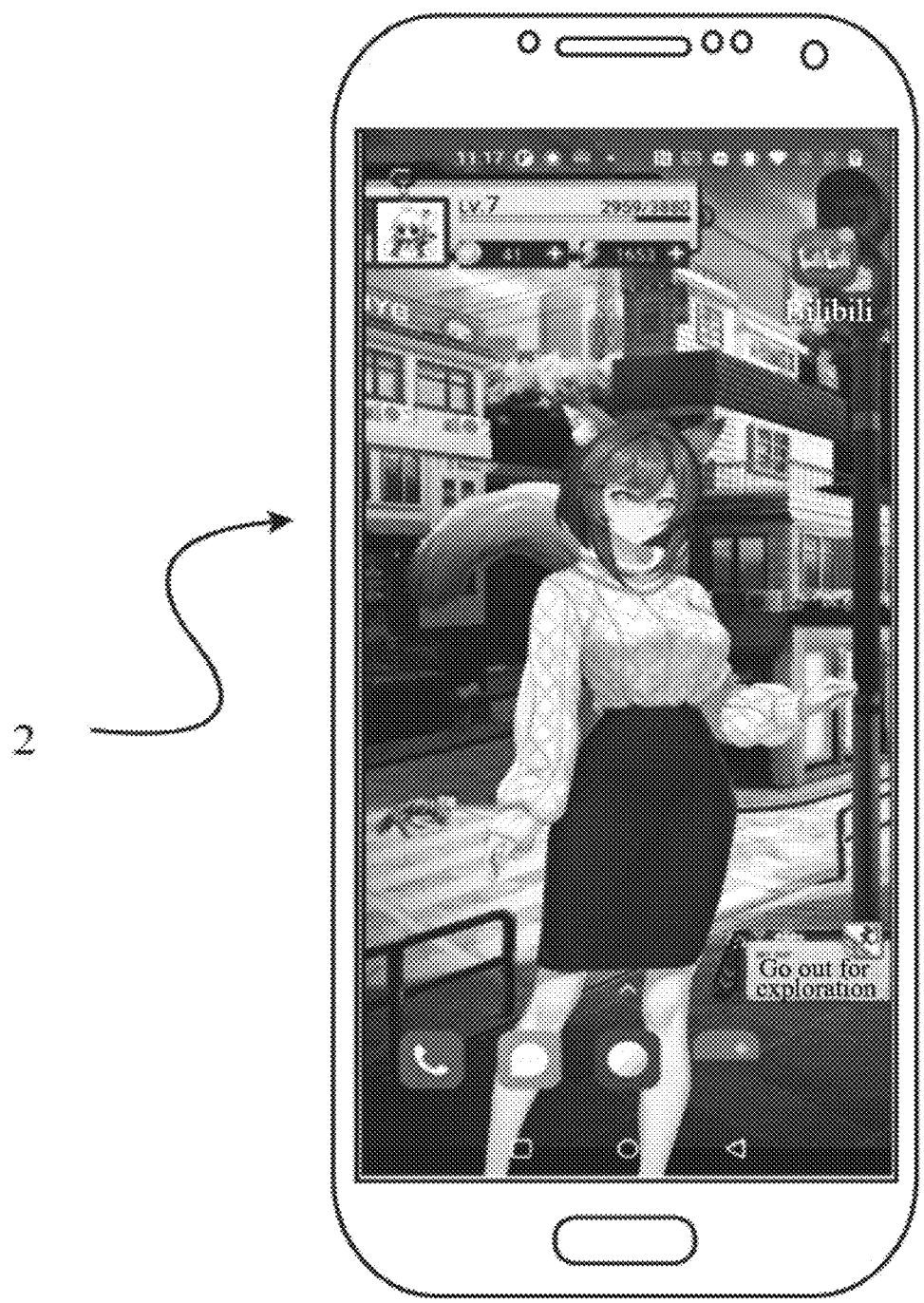
FIG. 1 is a diagram schematically showing an operating environment of a recording system according to an embodiment of the present application.

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Therefore, a feature defined by "first" or "second" may explicitly or implicitly includes at least one feature. Additionally, technical solutions in various embodiments may be combined with each other, provided that they can be implemented by persons of ordinary skill in the art. When a combination of the technical solutions incurs conflict or cannot be implemented, it should be considered that such a combination of the technical solutions does not exist, and does not fall within the claimed scope of protection of the present application either.

In the description of the present application, it should be understood that, the reference numerals of steps do not indicate the order of execution of the steps, but are merely to facilitate the description of the present application and differentiation between the steps, and thus will not be interpreted as limiting the present application.

Terms in the present application are explained as follows.

An OpenGL ES (OpenGL for Embedded Systems) is a subset of an OpenGL three-dimensional graphics API, and a set of API designed for embedded devices such as a mobile phone and a PDA. An OpenGL (Open Graphics Library) refers to a professional graphical programming interface that defines a cross-programming language and cross-platform programming interface specification. The OpenGL is used for three-dimensional images (or two-dimensional images) and is a powerful bottom-layer graphics library convenient to call.

An Android system is a free and open source operating system based on a Linux kernel. The Android system can be used for mobile devices, such as a smartphone and a tablet computer, and is led and developed by Google and Open Handset Alliance in the United States.

An FBO (Frame Buffer Object) is a container capable of being added with a buffer, and can be added with a texture or rendering buffer object.

A texture represents a photo image or a series of data and can be used to add details of an object.

An API (Application Program Interface) is a collection of definitions, programs, and protocols. The main function of the API includes providing a general function set. An API function is called to develop an application, which can reduce programming tasks. The API is also a middleware that provides data sharing for various different platforms.

A Surface is a handle of a raw buffer, by which drawing can be performed on the raw buffer.

A Surface View encapsulates and manages a Surface. The Surface can be used to perform drawing by the Surface View.

GLSurfaceView (a view proxy container), inherited from the SurfaceView (encapsulating the Surface View), can use the OperGL in Android.

GLThread is a rendering thread of the GLSurfaceView and can be used to perform OperGL drawing.

onDrawFrame provides a calling method, and each time it is called, a picture is refreshed once, so as to draw the latest frame, representing the current, by using the OpenGL. WallpaperService (a desktop wallpaper service) is responsible for displaying a dynamic wallpaper.

WallpaperService.Engine (a desktop wallpaper service engine) is an inner class in the WallpaperService, by which drawing of all display processes of the dynamic wallpaper is completed.

WallpaperManagerService (a wallpaper management service) is used to manage the operation and switching of wallpapers, and provides an interface for operating the wallpapers to the outside by a WallpaperManager class, which mainly reflects a management mode of the wallpapers by Android.

To facilitate those skilled in the art to understand the technical solutions provided by the embodiments of the present application, the related technologies are described below:

Operating systems generally provide wallpaper services. However, the wallpaper services provided by the current operating systems do not support rendering of games and live streaming, resulting in poor playability. The present application provides a solution for generating and displaying desktop wallpapers, including generation and display of dynamic desktop wallpapers in real time based on content of videos and/or games. Based on this, the desktop (such as an Android virtual desktop) can run interactive games or live streaming scenes, and can dynamically switch between different games or live streaming rooms, which improves the interactivity and playability. Details are described below.

FIG. 1 is a diagram schematically showing environmental operating of a display method for a virtual desktop according to an embodiment of the present application.

A mobile terminal 2 may include any type of computing devices using an Android operating system, such as mobile devices, tablet devices, laptop computers, virtual reality devices, game devices, set-top boxes, vehicle terminals, and smart televisions.

The mobile terminal 2 may be configured to run a game or live streaming program. The game program is used to provide the functions of game login, operation, payment, etc. The game program may be an online game or a local offline program in the mobile terminal. The live streaming program may further provide the functions of login, gift giving, bullet-screen comment sending, commodity link jumping, etc.

In the mobile terminal 2, dynamic images from a game or live streaming may be configured as desktop wallpapers and used for interaction between the game or live streaming program and a user. In other words, the dynamic images from the game or live streaming program may be output and presented to the user in the form of the desktop wallpaper in real time. In some embodiments, the content presented as the desktop wallpaper may include a game or live streaming login page, real-time images, comments, and/or similar items. Certainly, an audio may also be output with the permission of the user.

Embodiment 1

Figure 2:
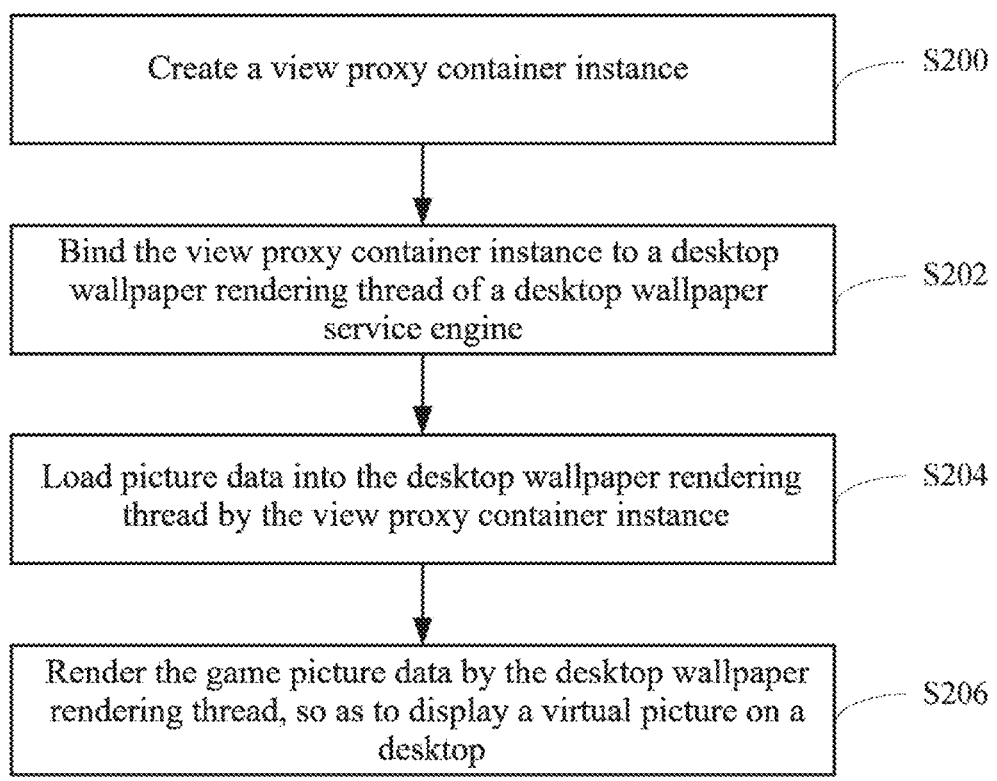
FIG. 2 is a flowchart schematically showing a display method for a virtual desktop according to Embodiment 1 of the present application.

FIG. 2 is a flowchart schematically showing a display method for a virtual desktop according to Embodiment 1 of the present application.

As shown in FIG. 2, the display method for a virtual desktop may include steps S200 to S206.

In step S200, a view proxy container instance is created in response to an operation performed on a control interface element, wherein the control element is configured to trigger generation and display of desktop wallpapers based on video or game frame images.

In step S202, the view proxy container instance is bound to a desktop wallpaper rendering thread of a desktop wallpaper service engine.

In step S204, image data is loaded into the desktop wallpaper rendering thread by the view proxy container instance, wherein the image data is acquired from a video or a game.

In step S206, a desktop wallpaper is generated based on rendering the image data by the desktop wallpaper rendering thread, and display a the desktop wallpaper on a desktop of a computing device.

According to the method for generating and displaying desktop wallpapers provided by the present application, the desktop wallpaper rendering thread of a WallpaperService.Engine is taken over, and the GLSurfaceView instance is bound to the desktop wallpaper rendering thread, so that the rendering operation of a target engine (such as a game engine and a live streaming picture engine) can be implemented in the desktop wallpaper rendering thread. Equivalently, the drawing layer of the target engine is wrapped in the desktop wallpaper rendering thread, the image data of the drawing layer of the target engine can be rendered in the desktop wallpaper rendering thread, and the rendering result of the image data is displayed on the desktop as the wallpaper. Therefore, in this embodiment of the present application, the Android desktop supports a dynamic picture from a game as a wallpaper of a mobile terminal 2, and may alternatively use a dynamic picture from live streaming or another application as a wallpaper, thereby providing good playability.

Each step in steps S200 to S206 and other newly added steps are described in detail with reference to FIG. 2 below.

It should be noted that the technical solution provided by this embodiment of the present application is carried out in an Android operating system environment and needs to rely on some services in Android operation, such as system wallpaper services and related services.

First, a wallpaper service instance is created and calling is performed to create corresponding WallpaperService.Engine and Surface handle. A desktop wallpaper service is a system wallpaper service provided by the Android system. Then subsequent support for a game or live streaming desktop is provided based on the WallpaperService.Engine and Surface handle.

One desktop provides one surface handle, and when the wallpaper service instance is created, the callback lifecycle of a Surface has already been completed, that is, a GLThread of the desktop has been created. However, the target engine has some pre-verification logics not in the GLThread, and only subsequent picture drawing is in the GLThread. As a result, there is a break therebetween, making it impossible to perform subsequent picture binding. Therefore, there is a solution that the picture from the game or live streaming is rendered in an off-screen environment and then synchronously drawn onto the desktop. Because the wallpaper service only provides one on-screen WallpaperService.Engine and one rendering thread, and cannot provide a second independent rendering thread to the target engine, the above solution is infeasible. Therefore, this embodiment adopts the following solution: The desktop wallpaper rendering thread of the WallpaperService. Engine is taken over to be a proxy for the rendering thread of the target engine, and the work of the rendering thread of the target engine is transferred to the desktop wallpaper rendering thread for processing. Details are described below.

In step S200, a view proxy container (GLSurfaceView) instance is created.

The GLSurface View instance specifies a Surface handle. The Surface handle is provided by a WallpaperService.Engine.

The GL Surface View instance may be used to provide a proxy for a game/live streaming canvas container and to distribute interaction events.

In step S202, the view proxy container instance is bound to a desktop wallpaper rendering thread of a desktop wallpaper service engine.

After the GLSurfaceView instance is bound to a desktop wallpaper rendering engine, the rendering of a game/live streaming may be processed by the desktop wallpaper rendering thread. In other words, the wallpaper rendering thread is a proxy for the work of a rendering thread of a target engine.

In step S204, image data is loaded into the desktop wallpaper rendering thread by the view proxy container instance.

In exemplary application, the desktop wallpaper rendering engine requests for the image data to the GLSurface View instance once every a period of time (such as 16.7 ms) by calling the onDrawFrame method. Specifically, the GLSurface View instance distributes an onDramFrame event called by the system to the target engine as a proxy.

Therefore, the target engine needs to provide image data of a frame of picture every 16.7 ms, so that the GLSurfaceView instance can respond to the request of the desktop wallpaper rendering engine and provide the image data to the desktop wallpaper rendering thread.

In step S206, the image data is rendered by the desktop wallpaper rendering thread, so as to display a virtual picture on a desktop.

The virtual picture may be a game scene picture, a live streaming picture, or a picture from other third-party applications.

Figure 3:
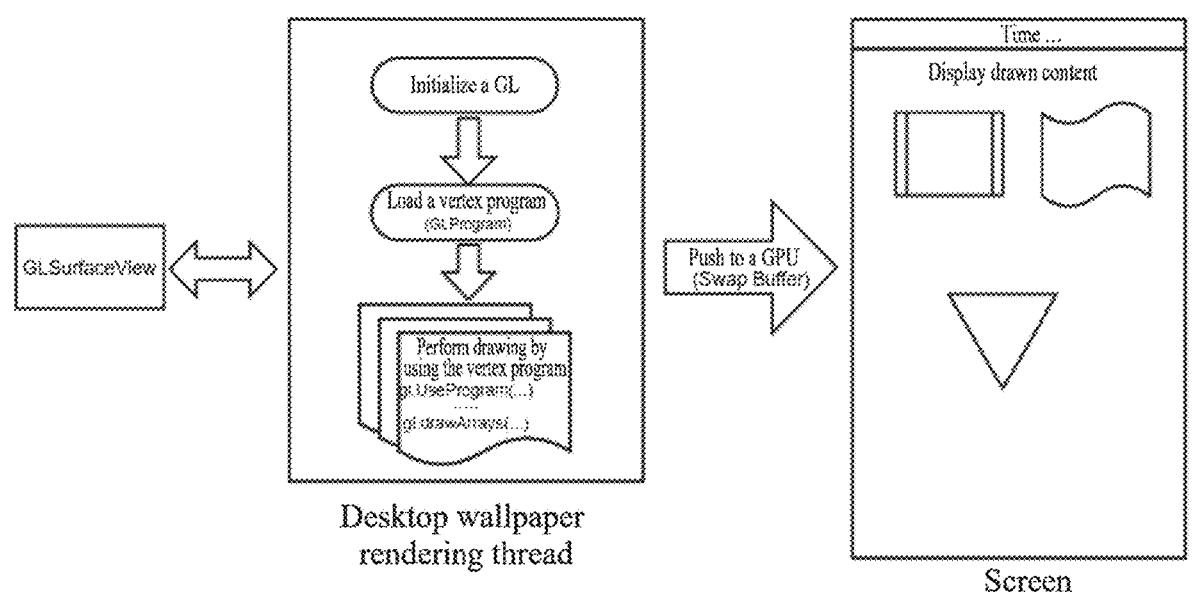
FIG. 3 schematically shows a drawing process.

The desktop wallpaper rendering thread (WallpaperGLRender) performs drawing by executing an OpenGL ES instruction using an onDrawFrame function, and pushes a rendered picture to a Swap buffer (screen swap buffer), so as to be displayed on a screen. As shown in FIG. 3, an operation process may be as follows: using a compiled vertex program→activating a texture unit→binding a texture id→binding vertex data→drawing and rendering→pushing data into the Swap buffer.

As the desktop wallpaper, the virtual picture is updated in real time with the progress of the game or live streaming. For example, the virtual picture is updated once every 16.7 ms. Certainly, in some embodiments, the virtual picture may alternatively be updated once at a longer interval to reduce power consumption.

Figure 4:
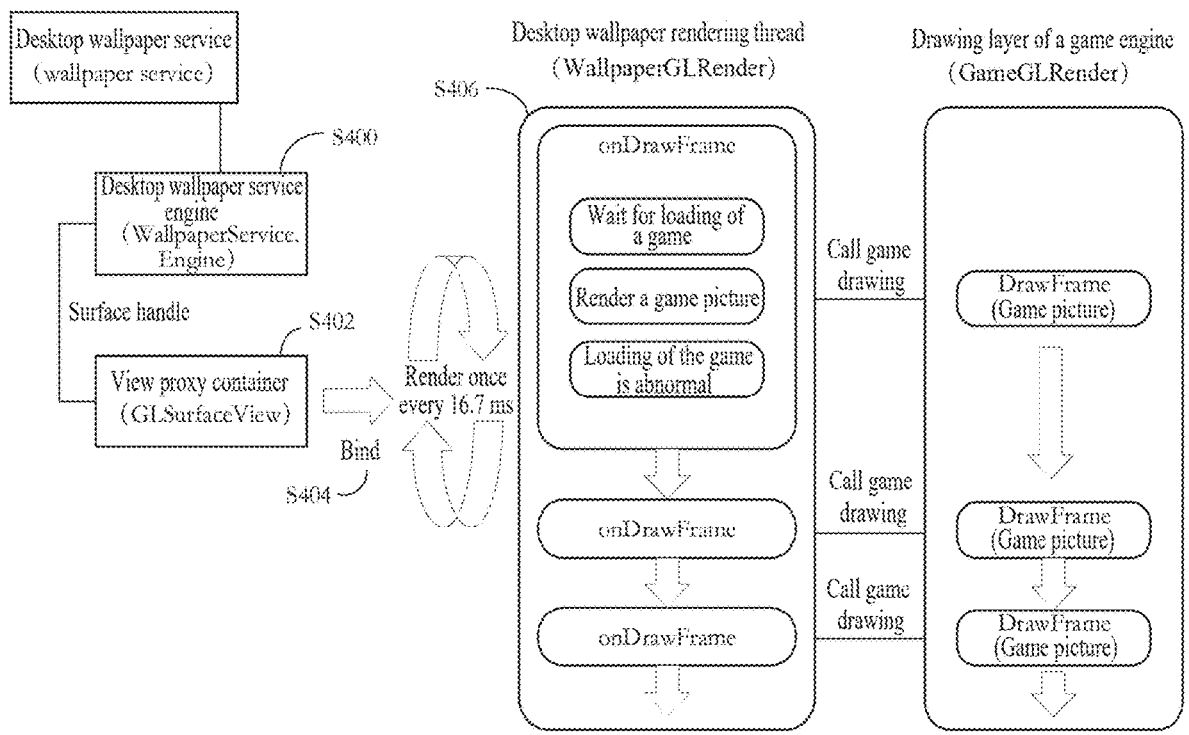
FIG. 4 schematically shows a loading and rendering process.

To make this embodiment easier to understand, an exemplary game picture loading and rendering process is provided with reference to FIG. 4 below.

In S400, calling is performed to create a WallpaperService. Engine and a Surface handle.

In S402, a GLSurfaceView instance is created, where the Surface handle returned by the GLSurfaceView instance is provided by the WallpaperService. Engine.

In S404, the GLSurface View instance is bound to a WallpaperGLRender.

In S406, game image data is obtained from the GLSurface View instance every 16.7 ms by an onDrawFrame function and rendered, where the game image data is drawing data provided by a drawing layer (GameGLRender) of a game engine. During loading, another wallpaper may be displayed first. If the loading is abnormal, the process exits or abnormal information is popped up.

Figure 5:
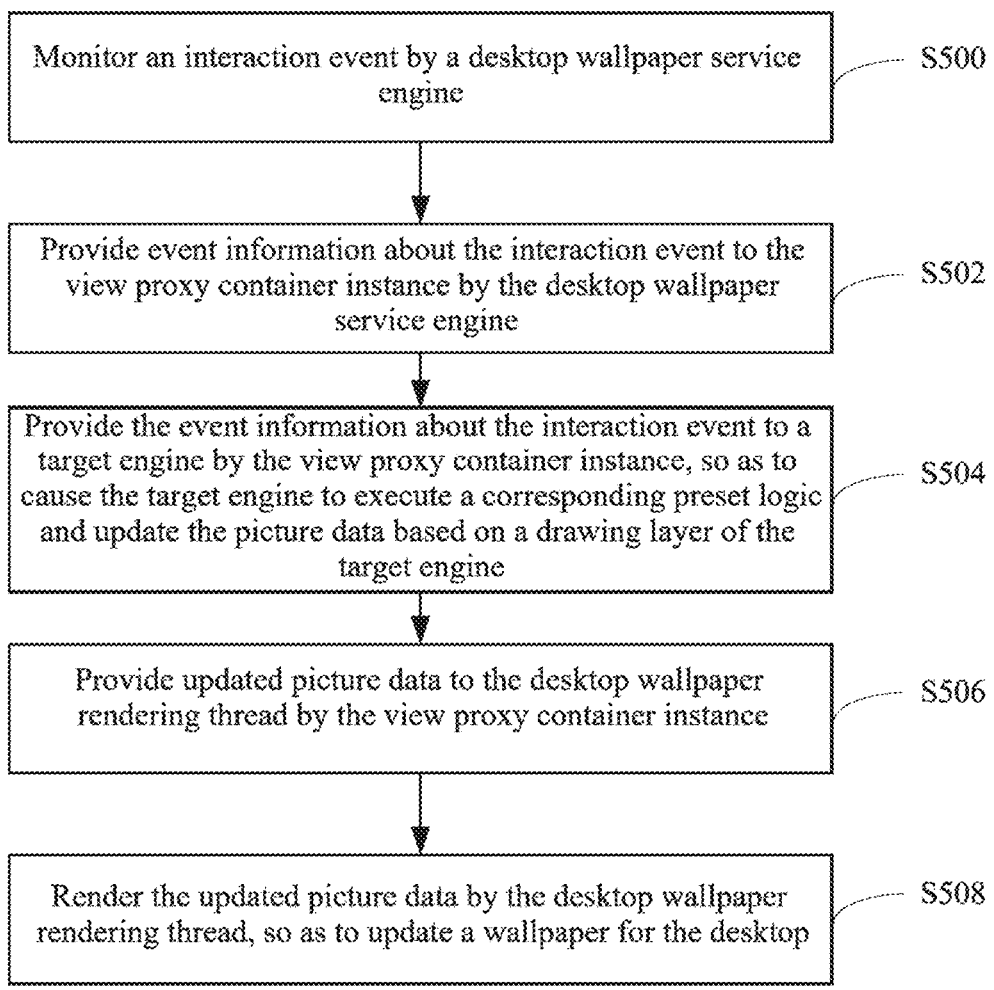
FIG. 5 is a flowchart schematically showing newly added steps of a display method for a virtual desktop according to Embodiment 1 of the present application.

In an optional embodiment, a function of interaction with a user may also be provided. As shown in FIG. 5, the method further includes:

step S500: monitoring an interaction event by the desktop wallpaper service engine;

step S502: providing event information about the interaction event to the view proxy container instance by the desktop wallpaper service engine;

step S504: providing the event information about the interaction event to a target engine by the view proxy container instance, so as to cause the target engine to execute a corresponding preset logic and update the image data based on a drawing layer of the target engine;

step S506: providing updated image data to the desktop wallpaper rendering thread by the view proxy container instance; and step S508: rendering the updated image data by the desktop wallpaper rendering thread, so as to update a wallpaper for the desktop.

The interaction event may be an onTouch (touch) event. The onTouch (touch) event may include the following: ACTION_DOWN (an action of tapping on a screen), ACTION_MOVE (a moving gesture), ACTION_UP (an action of leaving the screen), and ACTION_CANCEL (a cancel gesture). The onTouch (touch) event may alternatively be another trigger event. The GLSurfaceView instance provides a capability of distribution from the interaction event. During calling of a real tapping source, that is, an onTouch event function of WallpaperService.Engine, the interaction event may be distributed to the GLSurface View instance.

Figure 6:
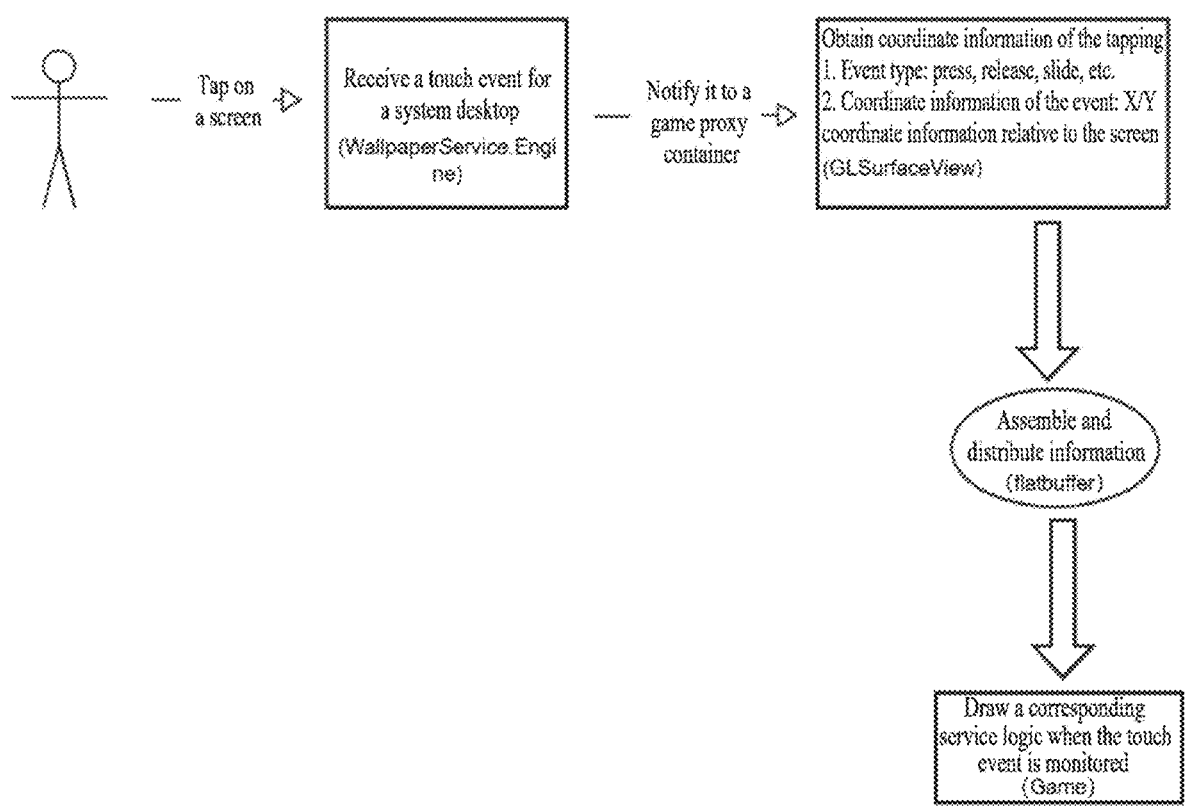
FIG. 6 is a diagram schematically showing an information flow of interactive tapping.

During a game desktop interaction process shown in FIG. 6, after the user taps on the screen, the system desktop (WallpaperService.Engine) may receive the tapping event and notify it to the game proxy container (GLSurfaceView instance). After the GLSurfaceView instance obtains coordinate information (X\Y coordinate information relative to the screen) and an event type (press, release, slide, etc.) of the tapping event, the above information is assembled and distributed to the target engine. The target engine draws a corresponding service logic and generates new image data based on the above information, and then hands over the new image data to the WallpaperGLRender for rendering. The WallpaperGLRender updates the desktop wallpaper based on a rendering result, so as to implement dynamic interaction. As shown in FIG. 1, when the user taps on the control element "go out for exploration", new streets and other pictures are displayed.

In an optional embodiment, switching to another game or live streaming room may also be performed to use a picture from it as the desktop wallpaper. The method further includes:

using a picture from other games or live streaming as the wallpaper for the desktop by switching the drawing layer of the target engine, which being convenient and efficient.

Figure 7:
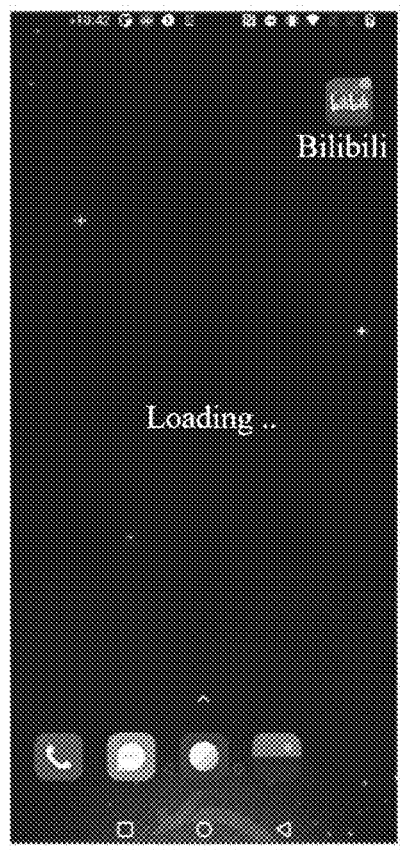
FIG. 7 schematically shows a desktop wallpaper during loading of a game.

During the process of waiting for loading of a resource package, there may be a "break", namely, a black screen on the desktop due to lack of the picture, resulting in poor experience. In a conventional client container, the container is a system interface activity (activity component), so that a native view can be added to display the loading, but the component cannot be added if there is no activity in the desktop. In this embodiment, an OpenGL instruction may be used to directly draw and render a loading wait state (as shown in FIG. 7). Details are as follows.

Figure 8:
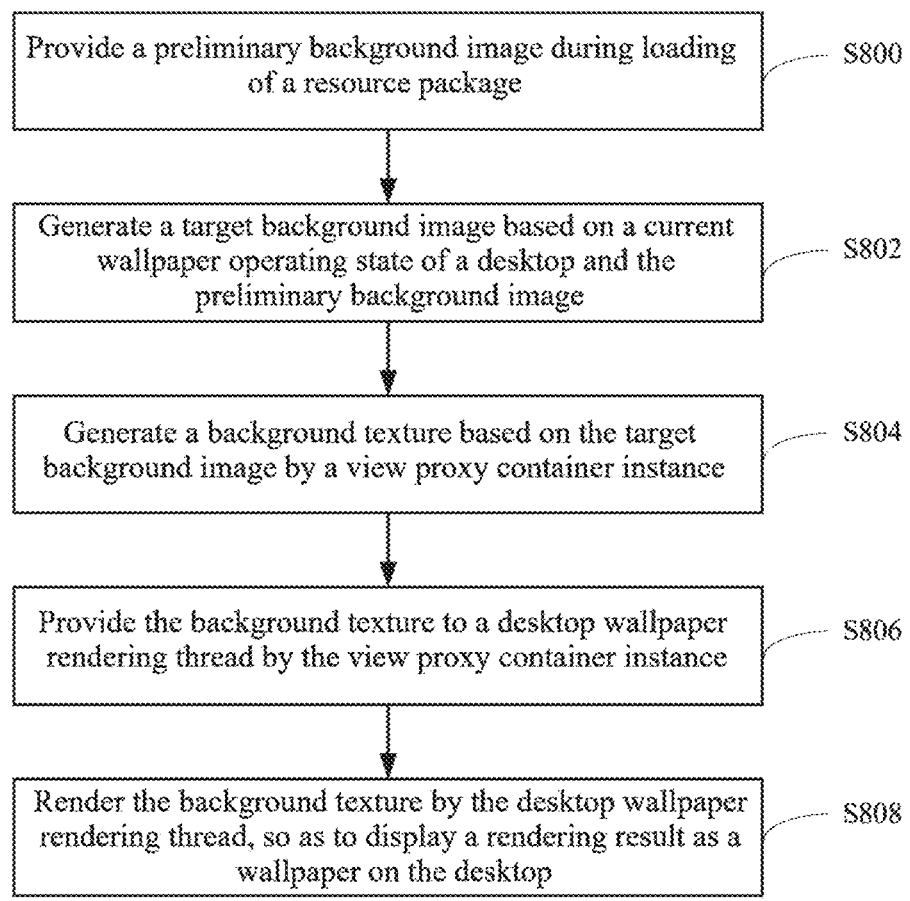
FIG. 8 is a flowchart schematically showing newly added steps of a display method for a virtual desktop according to Embodiment 1 of the present application.

In an optional embodiment, to avoid the black screen during loading of the resource package, as shown in FIG. 8, the method further includes: step S800: providing a preliminary background image during loading of a resource package; step S802: generating a target background image based on a current wallpaper operating state of the desktop and the preliminary background image; step S804: generating a background texture based on the target background image by the view proxy container instance; step S806: providing the background texture to the desktop wallpaper rendering thread by the view proxy container instance; and step S808: rendering the background texture by the desktop wallpaper rendering thread, so as to display a rendering result as a wallpaper on the desktop. Through steps S800 to S808, during loading of the resource package (codes and the like) for the game or live streaming, a loading wait process is rendered by the WallpaperGLRender, which improves the user experience.

Further, under the condition of displaying the loading wait process, to implement seamlessly picture transition and improve the user experience, the method further includes: switching to providing data by a drawing layer of a target engine when it is determined that drawing of a first frame of a target object (game or live streaming) is completed.

To further improve the user experience, pictures from a video and a game/live streaming may alternatively be set as the desktop wallpaper. Details are as follows.

Figure 9:
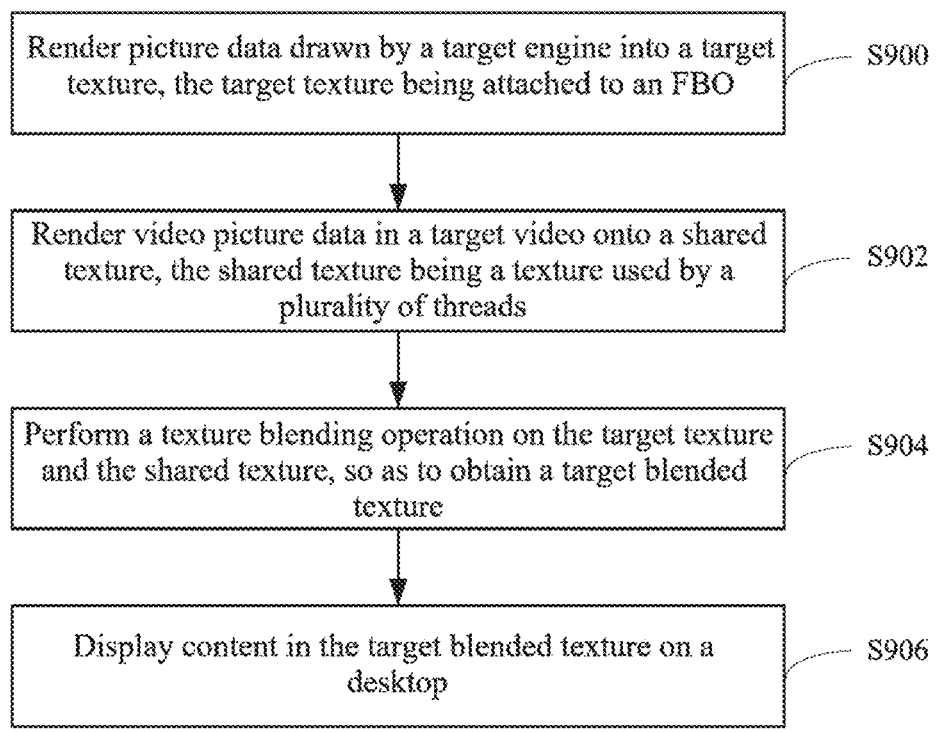
FIG. 9 is a flowchart schematically showing newly added steps of a display method for a virtual desktop according to Embodiment 1 of the present application.

In an optional embodiment, as shown in FIG. 9, the method may further include steps below.

In step S900, the image data drawn by the target engine is rendered into a target texture, where the target texture is attached to an FBO.

In step S902, video image data in a target video is rendered onto a shared texture, where the shared texture is a texture used by a plurality of threads. The video picture may be a real-time picture during live streaming or may be a predetermined picture.

In step S904, a texture blending operation is performed on the target texture and the shared texture, so as to obtain a target blended texture.

In step S906, content in the target blended texture is displayed on the desktop.

Further, to achieve a visual effect of overlaying a game or live streaming scene on top of a video and provide an interaction, step S906 may include: covering the shared texture with the target texture, so as to obtain the target blended texture.

Figure 10:
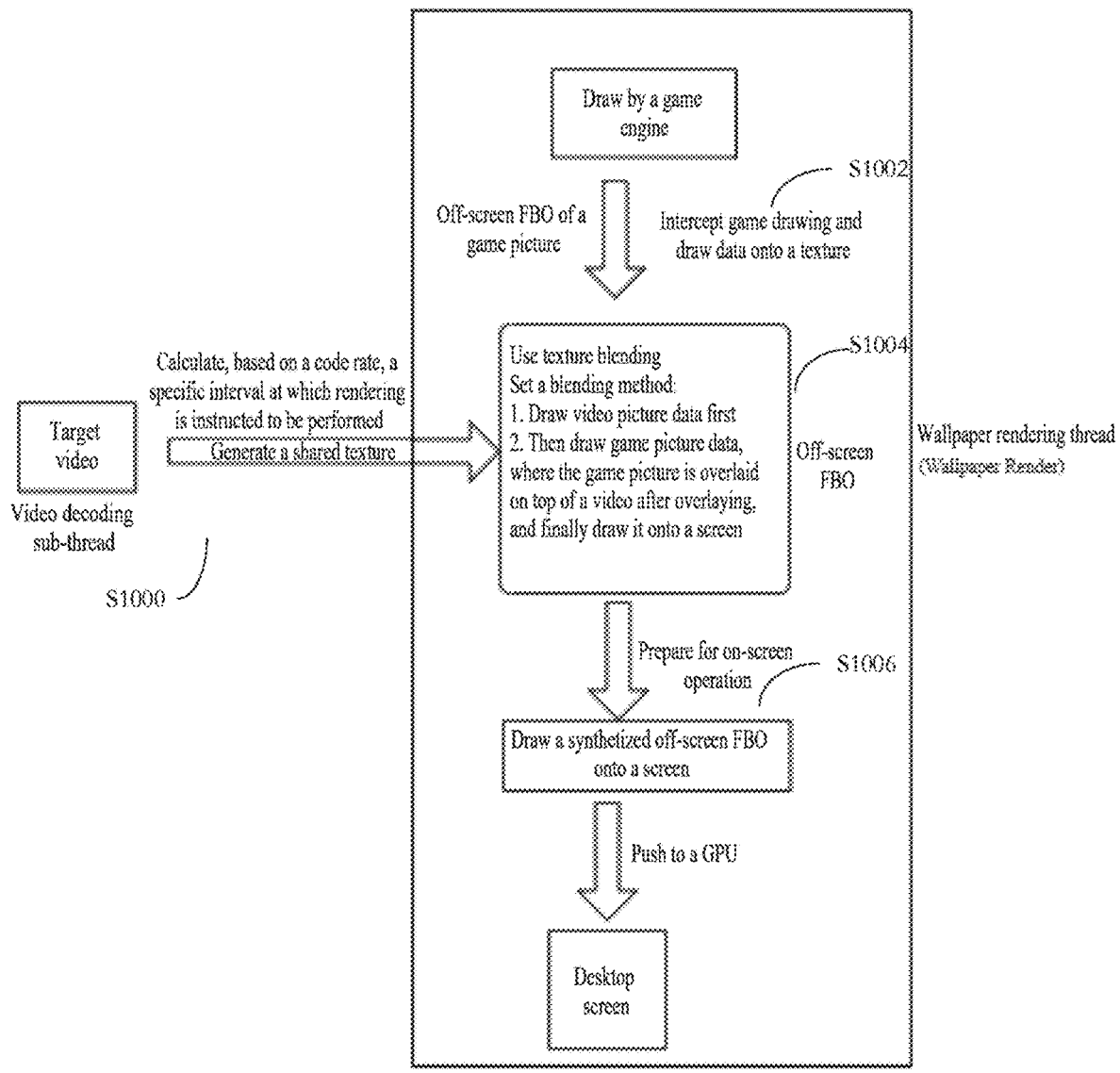
FIG. 10 is a flowchart schematically showing an operation of simultaneously loading a video and a game as a desktop wallpaper.

An implementation process of using both a picture from a video and a picture from a game as the desktop wallpaper is provided with reference to FIG. 10 below to help understand the above optional embodiment.

In step S1000, the target video is decoded by a video decoding sub-thread and the shared texture is generated.

The video decoding sub-thread can calculate, based on a code rate of the target video, a specific interval at which the WallpaperGLRender is instructed to perform rendering.

The shared texture is a texture capable of being used by a plurality of threads.

In step S1002, game drawing is intercepted and drawing data of the target engine is drawn onto the target texture.

The target texture is attached to an off-screen FBO of the picture.

In step S1004, texture blending is performed on the shared texture and the target texture.

A texture blending method may be as follows: The video image data (the shared texture) is drawn first and then the game image data (the target texture) is drawn. After overlaying using the above texture blending method, the game picture is overlaid on top of the target video.

In step S1006, a synthesized off-screen FBO is drawn onto a screen.

Embodiment 2

Figure 11:
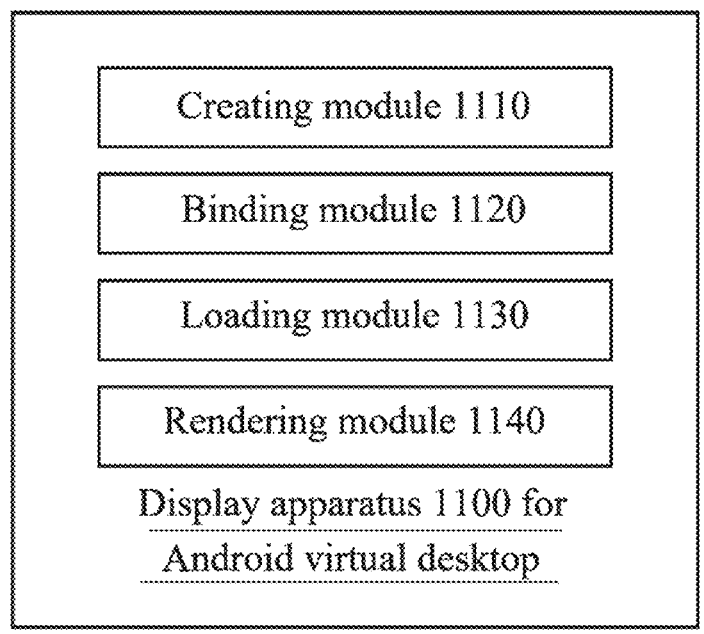
FIG. 11 is a block diagram schematically showing a display apparatus for a virtual desktop according to Embodiment 2 of the present application.

FIG. 11 is a block diagram schematically showing a display apparatus for a virtual desktop according to Embodiment 2 of the present application. The display apparatus for a virtual desktop may be divided into one or more program modules, and the one or more program modules are stored in a storage medium and executed by the one or more processors, so as to implement this embodiment of the present application. The program modules in this embodiment of the present application refer to a series of computer program instruction segments that can complete a specific function. The functions of the program modules in this embodiment are specifically described in the following description. As shown in FIG. 11, the display apparatus 1100 for a virtual desktop may include a creating module 1110, a binding module 1120, a loading module 1130, and a rendering module 1140.

The creating module 1110 is configured to create a view proxy container instance.

The binding module 1120 is configured to bind the view proxy container instance to a desktop wallpaper rendering thread of a desktop wallpaper service engine.

The loading module 1130 is configured to load a picture to be drawn into the desktop wallpaper rendering thread by the view proxy container instance.

The rendering module 1140 is configured to render image data by the desktop wallpaper rendering thread, so as to display a virtual picture on a desktop.

In an optional embodiment, the display apparatus 1100 for a virtual desktop may include an interaction module (not marked) configured to:
monitor an interaction event by the desktop wallpaper service engine;
provide event information about the interaction event to the view proxy container instance by the desktop wallpaper service engine;
provide the event information about the interaction event to a target engine by the view proxy container instance, so as to cause the target engine to execute a corresponding preset logic and update the image data based on a drawing layer of the target engine;
provide updated image data to the desktop wallpaper rendering thread by the view proxy container instance; and
render the updated image data by the desktop wallpaper rendering thread, so as to update a wallpaper for the desktop.

In an optional embodiment, the display apparatus 1100 for a virtual desktop may include a switching module (not marked) configured to
use a picture from other games or live streaming as the wallpaper for the desktop by switching the drawing layer of the target engine.

In an optional embodiment, the display apparatus 1100 for a virtual desktop may include a background transition module (not marked) configured to:
provide a preliminary background image during loading of a resource package;
generate a target background image based on a current wallpaper operating state of the desktop and the preliminary background image;
generate a background texture based on the target background image by the view proxy container instance;
provide the background texture to the desktop wallpaper rendering thread by the view proxy container instance; and
render the background texture by the desktop wallpaper rendering thread, so as to display a rendering result as a wallpaper on the desktop.

In an optional embodiment, the display apparatus 1100 for a virtual desktop may include a switching module (not marked) configured to
switch to providing data by a drawing layer of a target engine when it is determined that drawing of a first frame of a target object is completed.

In an optional embodiment, the display apparatus 1100 for a virtual desktop may include a display module (not marked) configured to:
render image data drawn by the target engine into a target texture, the target texture being attached to an FBO;
render video image data in a target video onto a shared texture, the shared texture being a texture used by a plurality of threads;
perform a texture blending operation on the target texture and the shared texture, so as to obtain a target blended texture; and
display content in the target blended texture on the desktop.

In an optional embodiment, the display module is further configured to cover the shared texture with the target texture, so as to obtain the target blended texture.

Embodiment 3

Figure 12:
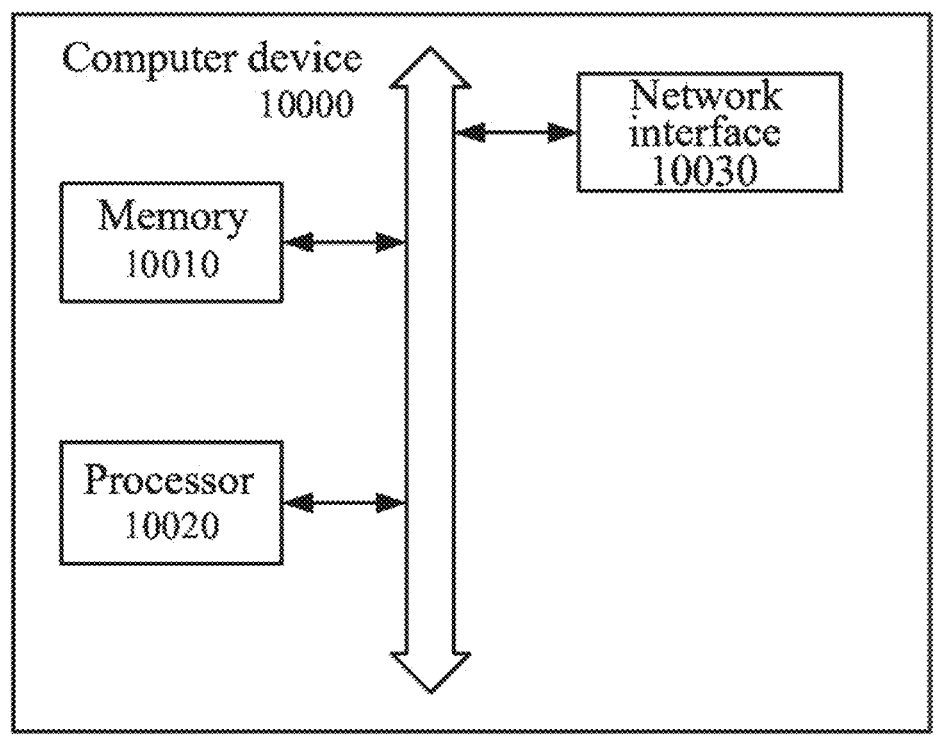
FIG. 12 is a schematic diagram schematically showing a hardware architecture of a computer device according to Embodiment 3 of the present application.

FIG. 12 is a schematic diagram schematically showing a hardware architecture of a computer device 10000 adapted to implement a display method for a virtual desktop according to Embodiment 3 of the present application. The computer device 10000 may be a mobile terminal 2 or a part of the mobile terminal 2. In this embodiment, the computer device 10000 is a device that can automatically perform numerical calculation and/or information processing according to preset or prestored instructions. For example, the computer device may be a smartphone, a tablet computer, a laptop, a personal computer, a virtual device, a set-top box, a television, a projector, a vehicle terminal, etc. As shown in FIG. 12, the computer device 10000 at least includes, but is not limited to, a memory 10010, a processor 10020, and a network interface 10030 which may be communicatively linked to each other by using a system bus, where the memory 10010 includes at least one type of computer-readable storage medium, and the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 10010 may be an internal storage module of the computer device 10000, for example, a hard disk or memory of the computer device 10000. In some other embodiments, the memory 10010 may alternatively be an external storage device of the computer device 10000, for example, a plug-in type hard disk equipped on the computer device 10000, a smart media card (SMC for short), a secure digital (SD for short) card, or a flash card. Certainly, the memory 10010 may alternatively include both the internal storage module of the computer device 10000 and the external storage device of the computer device. In this embodiment, the memory 10010 is generally configured to store an operating system and various application software installed in the computer device 10000, such as program codes for the display method for a virtual desktop. In addition, the memory 10010 may be further configured to temporarily store various types of data that have been output or are to be output.

The processor 10020 may be, in some embodiments, a central processing unit (CPU for short), a controller, a microcontroller, a microprocessor, or other data processing chips. The processor 10020 is generally configured to control overall operation of the computer device 10000, for example, execute control, processing, and the like related to data interaction or communication with the computer device 10000. In this embodiment, the processor 10020 is configured to run program code stored in the memory 10010 or to process data.

The network interface 10030 may include a wireless network interface or a wired network interface. The network interface 10030 is generally configured to establish a communication link between the computer device 10000 and other computer devices. For example, the network interface 10030 is configured to connect the computer device 10000 to an external terminal by using a network, and establish a data transmission channel, a communication link, and the like between the computer device 10000 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 12 shows only a computer device having components 10010-10030, but it should be understood that not all of the illustrated components are required to be implemented, and more or fewer components may be implemented instead.

In this embodiment, the display method for a virtual desktop that is stored in the memory 10010 may alternatively be divided into one or more program modules and executed by the one or more processors (the processor 10020 in this embodiment), so as to implement this embodiment of the present application.

Embodiment 4

The present application further provides a computer-readable storage medium having a computer program stored thereon, where the computer program, when executed by a processor, implements the steps of the display method for a virtual desktop in the embodiments.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various application software installed in the computer device, such as program codes for the display method for a virtual desktop in the embodiments. In addition, the computer-readable storage medium may be further configured to temporarily store various types of data that have been output or are to be output.

Embodiment 5

Figure 13:
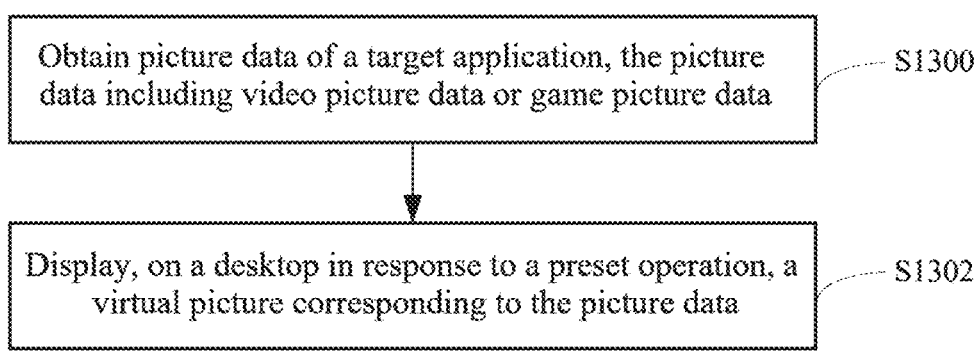
FIG. 13 is a flowchart schematically showing a display method for a virtual desktop according to Embodiment 5 of the present application.

FIG. 13 is a flowchart schematically showing a display method for a virtual desktop according to Embodiment 5 of the present application.

As shown in FIG. 13, the display method for a virtual desktop may include steps S1300 to S1302.

In step S1300, image data of a target application is obtained, where the image data includes video image data or game image data.

In step S1302, a virtual picture corresponding to the image data is displayed on a desktop in response to a preset operation.

During the process of watching a video or playing a game, a user may feel that a frame or several frames or a real-time frame can be used as a wallpaper. In this case, the user can use a specified frame or real-time frame of the video or game as the desktop wallpaper by triggering a corresponding control element, thereby enhancing the playability of the wallpaper, improving the user experience, and also facilitating the promotion of the live streaming and the game.

It should be noted that displaying, on a desktop, a virtual picture corresponding to the image data, can be implemented by using the method described in Embodiment 1.

For example, step S1302 may include:
creating a view proxy container instance in response to a preset operation;
binding the view proxy container instance to a desktop wallpaper rendering thread of a desktop wallpaper service engine;
loading image data into the desktop wallpaper rendering thread by the view proxy container instance; and
rendering the image data by the desktop wallpaper rendering thread, so as to display a virtual picture on a desktop.

Further, there may also be provided an interaction function based on wallpapers such as pictures from live streaming, the game, etc., such as link jumping and giving a like.

The specific implementation step may include:
monitoring an interaction event by the desktop wallpaper service engine;
providing event information about the interaction event to the view proxy container instance by the desktop wallpaper service engine;
providing the event information about the interaction event to a target engine by the view proxy container instance, so as to cause the target engine to execute a corresponding preset logic and update the image data based on a drawing layer of the target engine;
providing updated image data to the desktop wallpaper rendering thread by the view proxy container instance; and
rendering the updated image data by the desktop wallpaper rendering thread, so as to update a wallpaper for the desktop.

Further, there may also be provided a switching function based on wallpapers such as pictures from live streaming, the game, etc., such as switching the wallpaper from the live streaming picture to the game picture. The specific implementation step includes: using a picture from other games or live streaming as the wallpaper for the desktop by switching the drawing layer of the target engine.

Further, a wallpaper of a video and a game may also be provided. The specific implementation step includes: rendering image data drawn by the target engine into a target texture, the target texture being attached to an FBO; rendering video image data in a target video onto a shared texture, the shared texture being a texture used by a plurality of threads; performing a texture blending operation on the target texture and the shared texture, so as to obtain a target blended texture; and displaying content in the target blended texture on the desktop.

It should be noted that, for the technical content and effects of this embodiment, reference may be made to the content in Embodiment 1 and will not be repeated herein.

The method according to this embodiment may be stored in a code form in the computer device in Embodiment 3 and the computer-readable storage medium in Embodiment 4.

It will be apparent to those skilled in the art that the various modules or steps in the embodiments of the present application can be implemented by a general-purpose computing apparatus that can be centralized on a single computing apparatus or distributed across a network formed by a plurality of computing apparatuses. Optionally, they may be implemented by program code executable by the computing apparatus, such that they may be stored in a storage apparatus and executed by the computing apparatus, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

It should be noted that the foregoing descriptions are merely preferred embodiments of the present application, and are not intended to limit the patent scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method for generating and displaying desktop wallpapers, comprising:
   creating a view proxy container instance by a computing device having an operating system in response to an operation performed on a control interface element of the computing device, wherein the computing device is configured to run a live streaming or game program, and wherein the control interface element is configured to trigger generation and display of desktop wallpapers based on video or game frame images from the live streaming or game program;
   binding, by the computing device, the view proxy container instance to a desktop wallpaper rendering thread of a desktop wallpaper service engine;
   loading image data into the desktop wallpaper rendering thread by the view proxy container instance, wherein the image data is acquired from the live streaming or game program;
   generating a desktop wallpaper based on rendering the image data by the desktop wallpaper rendering thread; and
   displaying the desktop wallpaper on a desktop of the computing device.

2. The method according to claim 1, further comprising:
   monitoring an interaction event by the desktop wallpaper service engine;
   providing event information about the interaction event to the view proxy container instance by the desktop wallpaper service engine;
   providing the event information about the interaction event to a target engine by the view proxy container instance, wherein the target engine executes a corresponding preset logic and updates the image data based on a drawing layer of the target engine;
   providing the updated image data to the desktop wallpaper rendering thread by the view proxy container instance;
   generating an updated desktop wallpaper based on rendering the updated image data by the desktop wallpaper rendering thread; and
   displaying the updated desktop wallpaper on the desktop of the computing device.

3. The method according to claim 2, further comprising:
generating a new desktop wallpaper based on other image data from another video, another game, or live streaming by switching the drawing layer of the target engine.

4. The method according to claim 1, further comprising:
providing a preliminary background image during loading of a resource package;
generating a target background image based on a current wallpaper operating state of the desktop and the preliminary background image;
generating a background texture based on the target background image by the view proxy container instance;
providing the background texture to the desktop wallpaper rendering thread by the view proxy container instance; and
rendering the background texture by the desktop wallpaper rendering thread and displaying a rendering result as the desktop wallpaper on the desktop.

5. The method according to claim 4, further comprising:
switching to provide data by a drawing layer of a target engine when it is determined that drawing of a first frame of a target object is completed.

6. The method according to claim 1, further comprising:
rendering image data drawn by the target engine into a target texture, the target texture being attached to a Frame Buffer Object (FBO);
rendering video image data of a target video onto a shared texture, the shared texture being a texture utilized by a plurality of threads;
performing a texture blending operation on the target texture and the shared texture and obtaining a target blended texture; and
displaying content in the target blended texture on the desktop.

7. A computing device, comprising a memory, a processor, and a computer program stored on the memory and executable by the processor, wherein the computer program, when executed by the processor, cause the processor to implement operations comprising:
creating a view proxy container instance by the computing device having an operating system in response to an operation performed on a control interface element of the computing device, wherein the computing device is configured to run a live streaming or game program, and wherein the control interface element is configured to trigger generation and display of desktop wallpapers based on video or game frame images from the live streaming or game program;
binding, by the computing device, the view proxy container instance to a desktop wallpaper rendering thread of a desktop wallpaper service engine;
loading image data into the desktop wallpaper rendering thread by the view proxy container instance, wherein the image data is acquired from the live streaming or game program;
generating a desktop wallpaper based on rendering the image data by the desktop wallpaper rendering thread; and
displaying the desktop wallpaper on a desktop of the computing device.

8. The computing device according to claim 7, the operations further comprising:
monitoring an interaction event by the desktop wallpaper service engine;
providing event information about the interaction event to the view proxy container instance by the desktop wallpaper service engine;
providing the event information about the interaction event to a target engine by the view proxy container instance, wherein the target engine executes a corresponding preset logic and updates the image data based on a drawing layer of the target engine;
providing the updated image data to the desktop wallpaper rendering thread by the view proxy container instance;
generating an updated desktop wallpaper based on rendering the updated image data by the desktop wallpaper rendering thread; and
displaying the updated desktop wallpaper on the desktop of the computing device.

9. The computing device according to claim 8, the operations further comprising:
generating a new desktop wallpaper based on other image data from another video, another game, or live streaming by switching the drawing layer of the target engine.

10. The computing device according to claim 7, the operations further comprising:
providing a preliminary background image during loading of a resource package;
generating a target background image based on a current wallpaper operating state of the desktop and the preliminary background image;
generating a background texture based on the target background image by the view proxy container instance;
providing the background texture to the desktop wallpaper rendering thread by the view proxy container instance; and
rendering the background texture by the desktop wallpaper rendering thread and displaying a rendering result as the desktop wallpaper on the desktop.

11. The computing device according to claim 10, the operations further comprising:
switching to provide data by a drawing layer of a target engine when it is determined that drawing of a first frame of a target object is completed.

12. The computing device according to claim 7, the operations further comprising:
rendering image data drawn by the target engine into a target texture, the target texture being attached to a Frame Buffer Object (FBO);
rendering video image data of a target video onto a shared texture, the shared texture being a texture utilized by a plurality of threads;
performing a texture blending operation on the target texture and the shared texture and obtaining a target blended texture; and
displaying content in the target blended texture on the desktop.

13. A non-transitory computer-readable storage medium, storing a computer program, wherein the computer program, when executed by at least one processor, causes the at least one processor to perform operations comprising:
creating a view proxy container instance by a computing device having an operating system in response to an operation performed on a control interface element of the computing device, wherein the computing device is configured to run a live streaming or game program, and wherein the control interface element is configured to trigger generation and display of desktop wallpapers based on video or game frame images from the live streaming or game program;

binding, by the computing device, the view proxy container instance to a desktop wallpaper rendering thread of a desktop wallpaper service engine;

loading image data into the desktop wallpaper rendering thread by the view proxy container instance, wherein the image data is acquired from the live streaming or game program;

generating a desktop wallpaper based on rendering the image data by the desktop wallpaper rendering thread; and displaying the desktop wallpaper on a desktop of the computing device.

14. The non-transitory computer-readable storage medium according to claim 13, the operations further comprising:

monitoring an interaction event by the desktop wallpaper service engine;

providing event information about the interaction event to the view proxy container instance by the desktop wallpaper service engine;

providing the event information about the interaction event to a target engine by the view proxy container instance, wherein the target engine executes a corresponding preset logic and updates the image data based on a drawing layer of the target engine;

providing the updated image data to the desktop wallpaper rendering thread by the view proxy container instance;

generating an updated desktop wallpaper based on rendering the updated image data by the desktop wallpaper rendering thread; and displaying the updated desktop wallpaper on the desktop of the computing device.

15. The non-transitory computer-readable storage medium according to claim 14, the operations further comprising:

generating a new desktop wallpaper based on other image data from another video, another game, or live streaming by switching the drawing layer of the target engine.

16. The non-transitory computer-readable storage medium according to claim 13, the operations further comprising:

providing a preliminary background image during loading of a resource package;

generating a target background image based on a current wallpaper operating state of the desktop and the preliminary background image;

generating a background texture based on the target background image by the view proxy container instance;

providing the background texture to the desktop wallpaper rendering thread by the view proxy container instance; and rendering the background texture by the desktop wallpaper rendering thread and displaying a rendering result as the desktop wallpaper on the desktop.

17. The non-transitory computer-readable storage medium according to claim 16, the operations further comprising:

switching to provide data by a drawing layer of a target engine when it is determined that drawing of a first frame of a target object is completed.

18. The non-transitory computer-readable storage medium according to claim 13, the operations further comprising:

rendering image data drawn by the target engine into a target texture, the target texture being attached to a Frame Buffer Object (FBO);

rendering video image data of a target video onto a shared texture, the shared texture being a texture utilized by a plurality of threads;

performing a texture blending operation on the target texture and the shared texture and obtaining a target blended texture; and displaying content in the target blended texture on the desktop.

* * * * *